United States Patent
Thoma et al.

[11] Patent Number: 5,812,309
[45] Date of Patent: Sep. 22, 1998

[54] INFRARED OBJECTIVE

[75] Inventors: Christoph Thoma, Unterschleissheim; Matthias Erdmann, München; Johann Schweiger, Freising; Karl Pietzsch, Geretsried, all of Germany

[73] Assignee: Steinheil Optronik GmbH, Ismaning, Germany

[21] Appl. No.: 749,599

[22] Filed: Apr. 4, 1996

Related U.S. Application Data

[63] Continuation of Ser. No. 291,533, Aug. 16, 1994, abandoned.

[30] Foreign Application Priority Data

Aug. 17, 1993 [DE] Germany .......................... 43 27 656.3

[51] Int. Cl.$^6$ .............................. G01J 5/08; G02B 13/14
[52] U.S. Cl. ....................................... 359/357; 359/361
[58] Field of Search ..................... 359/350, 355, 359/356, 357, 359, 361; 250/352, 353

[56] References Cited

U.S. PATENT DOCUMENTS

| | | | |
|---|---|---|---|
| 3,813,552 | 5/1974 | Johnson | 359/355 |
| 4,383,727 | 5/1983 | Rogers | 359/357 |
| 4,542,954 | 9/1985 | Stoltzmann | 359/357 |
| 4,820,923 | 4/1989 | Wellman | 250/352 |
| 4,827,130 | 5/1989 | Reno | 359/357 |
| 4,937,450 | 6/1990 | Wakabayashi et al. | 359/350 |
| 4,990,782 | 2/1991 | Wellman et al. | 359/350 |
| 5,031,976 | 7/1991 | Shafer | 359/355 |
| 5,140,459 | 8/1992 | Sagan | 359/364 |
| 5,258,618 | 11/1993 | Noble | 359/359 |

FOREIGN PATENT DOCUMENTS

| | | |
|---|---|---|
| 0408235 | 1/1991 | European Pat. Off. . |
| 1393576 | 2/1964 | France . |
| 3723982 | 2/1989 | Germany . |
| 2233854 | 1/1991 | United Kingdom . |

*Primary Examiner*—Jon W. Henry
*Attorney, Agent, or Firm*—Kanesaka & Takeuchi

[57] ABSTRACT

The invention relates to an infrared objective (IR objective) with a lens arrangement for the production of an infrared image on a detector element of infrared detector equipment. In this respect it may be a question of a focal plane array (FPA) within a Dewar vessel with an internal cold shield for substantially preventing access of thermal radiation from the surroundings (spurious light fractions). The internal cold shield is placed behind an external uncooled cold shield comprising several staggered external cold diaphragms. In this respect the external cold shield is partly arranged in front of and/or partly within the lens arrangement, the external cold shield with the lens arrangement being so designed and so arranged in relation to the internal cold shield that each optical ray, which comes from the lens element and is outside the optical pupil, is reflected back via the external cold shield and the lens arrangement into the or, respectively, on the internal cold shield, one of the cold diaphragms constituting the aperture diaphragm. The infrared objective may be designed telecentrically. The infrared objective may be a component of a complex infrared optical system (for instance as a front afocal).

9 Claims, 2 Drawing Sheets

INFRARED OBJECTIVE

This is a continuation of application Ser. No. 08/291,533, filed Aug. 16, 1994, abandoned.

BACKGROUND OF THE INVENTION

1. Field of the Invention

The invention relates to an infrared objective.

2. Description of the Prior Art

Detector equipment for infrared rays which possesses a cooled Dewar vessel, wherein an infrared receiver is accommodated, preferably in the form of a focal plane array (FPA) and which is shut off from the infrared optical system by an infrared window transparent to infrared radiation, are well known. The Dewar vessel frequently comprises a housing connected with a source of vacuum, and which is shut off from the outside by the infrared window. Inside the housing a cold shield, preferably in the form of a cavity, is located to substantially the access of infrared radiation from the surroundings of the equipment with the exception of a ray inlet opening as determined by an optical aperture in accordance with prior art and is constituted by a physical internal cold diaphragm, which if necessary is cooled and blackened, and is located in the Dewar vessel and as a so-called rear diaphragm arranged behind the infrared optical system in terms of the direction of the light radiation, something constituting a substantial disadvantage as regards the design of the optical system. The internal cold diaphragm is accordingly simultaneously the exit pupil of the optical system. Vignetting of such pupil will in this case lead to the undesired entry of thermal radiation into the ray detector equipment. The consequences for the optical design are an oversize free diameter of the lenses, something responsible for disadvantages as regards the volume, weight and price of the equipment, unless vignetting with all the disadvantages connected therewith is accepted. These disadvantages are more particularly severe in the case of infrared ray detector equipment operating with FPAs and in the case of a substantial focal length of the optical system or, respectively, in the case of a large entry pupil (greater absolute free diameter of the lens elements and front lens).

SUMMARY OF THE INVENTION

One object of the present invention is to provide an infrared optical system of the sort noted initially, which makes do with an optical system free from vignetting, is comparatively low in weight, has a small volume and in the case which of the number and size of the lens elements is substantially less than in the case of comparable known optical systems.

This object is to be attained by the characterizing features of this invention.

Advantageous further developments of the invention will be gathered from the following description of one embodiment thereof.

An optical system in accordance with teaching of the invention having external cold shields arranged in a staggered manner possesses substantial advantages over the prior art, as may be seen on considering optical transmission and the improved efficiency of the cold shield. The staggered arrangement of the spherical or aspherical three-dimensional segment-like diaphragm renders possible for example a lens structure in the form of a four lens optical system free of vignetting and with a comparatively small volume, the external cold diaphragms being arranged partly in front of, partly between and partly behind the lenses. In this respect there is the advantage that the optical system can be produced without overdimensioning the front lens. A further point is that comparatively large cold shield efficiencies are possible in accordance with the invention, amounting for example to over 83%. It is a particular advantage to design an objective in accordance with the invention with a telecentric diaphragm to the fore without pupil offsetting means. The aperture diaphragm may however also be located between the lens elements. Using intermediately placed external cold shields it is possible for the free diameters of the lens elements adjacent to front of the system to be reduced. It is an advantage for the aperture diaphragm is able to be adjustable as regards its opening and/or able to be interchanged. The objective in accordance with the invention may also be a component of a more complex infrared optical system. Thus for example the optical system in accordance with the invention may be arranged following a front afocal system.

The design of the Dewar vessel may be conventional or in accordance with the prior German patent application P 43 03 231.a.

Further advantageous developments and convenient forms of the invention will be understood from the following detailed descriptive disclosure of one embodiment thereof in conjunction with the accompanying drawings.

DESCRIPTION OF THE PREFERRED EMBODIMENT

Figure 1:
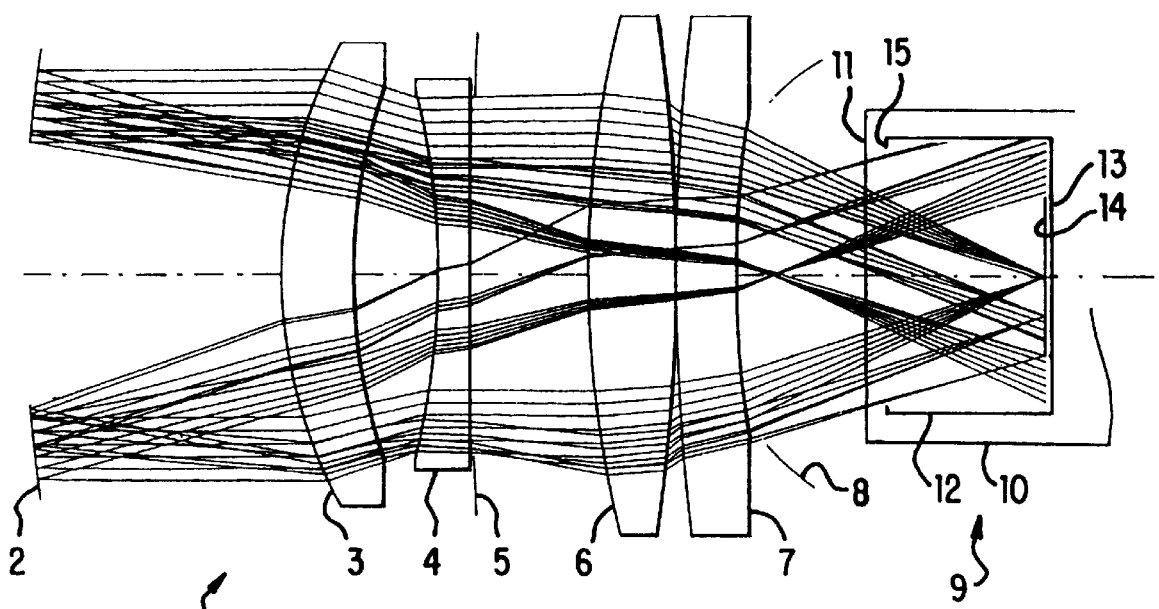
FIG. 1 shows an infrared optical system in accordance with the invention with a telecentric diaphragm in front of it.

As shown in FIG. 1 an infrared optical system designed in accordance with the invention comprises, as considered in the direction of light propagation, a first cold diaphragm (front diaphragm) 2, a first and a second lens 3 and 4, a second cold diaphragm (intermediate diaphragm) 5, a third and a fourth lens 6 and 7 and a third cold diaphragm 8. The optical system in accordance with the invention (2 through 8) is placed directly in front of infrared ray detector equipment 9.

The external cold diaphragms 2, 5 and 8 constitute in common an external cold shield, which is placed partly in front of, partly within and partly behind the lens arrangement 3, 4, 6, and 7.

The ray detector equipment 9 comprises a Dewar vessel 10, which comprises a housing connected with a vacuum pump, such housing being closed on the ray entry side by an window 11 (infrared window) transparent to infrared radiation, such window not being depicted in order to make the drawing more straightforward. Opposite the infrared window 11 within the Dewar vessel 10 there is a cold shield 12 (the internal cold shield) in the form of a cavity, on whose rear wall 13, which is arranged opposite to the infrared window 11 at a distance therefrom, a detector element 14 is placed in the form of a focal plane array or FPA. The internal cold shield serves to substantially prevent access of thermal radiation from the surroundings to the ray detector equipment 9 within the exception of the diaphragm-like ray inlet opening (internal cold diaphragm) 15 opposite to the infrared window 11. In other words the access of spurious light from the warm surroundings is to be substantially suppressed, which not only contributes to noise at the detector equipment (poorer NETD) but more particularly reduces the effective dynamic fraction of the infrared detector element 14 (low saturation temperature).

Ray detector equipment 9 with an internal cold shield arranged within a Dewar vessel, wherein the cooled detector element is arranged opposite to an internal cold diaphragm, which determines the ray entry opening of the internal cold shield, is familiar to those in the art. To this extent reference should be had to the German patent publication 37 16 358. An internal cold shield, more particularly for an FPA, which substantially foreshortened along the optic axis in a novel manner in comparison with known internal cold shields is disclosed in the said prior German patent publication P 43 03 231.1 dated Apr. 2, 1993.

The infrared objective in accordance with the invention is independent of the design of the Dewar vessel. Preferably the infrared objective in accordance with the invention is placed directly in front of a Dewar vessel with an internal cold shield in accordance with the teaching of the said German patent publication P 43 03 231.1. The infrared objective is however in this respect not subject to any limitations. The Dewar vessel design can be conventional.

In FIG. 1 the foremost (first) cold diaphragm 2 is the aperture diaphragm, which, as measured along the optic axis is at a relatively large distance from the first lens as shown in FIG. 1. At rear side of the second lens the intermediate diaphragm 5 is located. By means of this intermediate diaphragm 5 acting as a baffle there is the advantage that it is possible for the free diameters of the first and second lenses 3 and 4 to be made smaller than the free diameters of the third and fourth lenses 6 and 7, which are determined by the third cold diaphragm 8. The third biconvex lens 6 may in this case be made with an ample thickness so that in accordance with the invention thin marginal zones may be avoided.

FIG. 1 shows the special case of an objective in accordance with the invention with a telecentric front diaphragm 2 without pupil offsetting means. The third cold diaphragm 8 is arranged directly in front of the infrared window 11 of the Dewar vessel, which window may be equally properly considered as belonging to the Dewar vessel or to the infrared objective in accordance with the invention. The cold diaphragm 8 can be designed and arranged in accordance with the German patent publication 3,716,358 or the German patent publication 3,723,982.

As shown in FIG. 1 the lens arrangement comprising the lenses 3, 4 and 6, 7 together with the external cold shield 2, 5 and 8 is so designed in accordance with the invention that each optical ray, which comes from the detector element 14 and is outside the optical pupil, is reflected back through the lens arrangement to the front diaphragm 2 and thence via the lens arrangement to the internal cold shield 12.

However to the extent that a part of the reflected back light rays is incident on the optical surface of the detector element 14, the same will not produce an sharp reflection image. However on the contrary it will be clear to the man in the art that in accordance with the teaching of the patent the conditions may be furthermore so selected that the rays reflected back from the front diaphragm 2 will be incident in or, respectively, on the internal cold shield 12 outside the optical area of the detector element 14. Moreover there is no intermediate image in the ray path between the external cold shield 2, 5 and 8 and the Dewar vessel 9, in which respect in order to make the drawing more straightforward merely reflected rays are shown between the internal cold shield 12 and the front diaphragm 2. Reflected rays between the internal cold shield 11 and the intermediate diaphragm 5 are apparent in FIG. 2.

Figure 2:
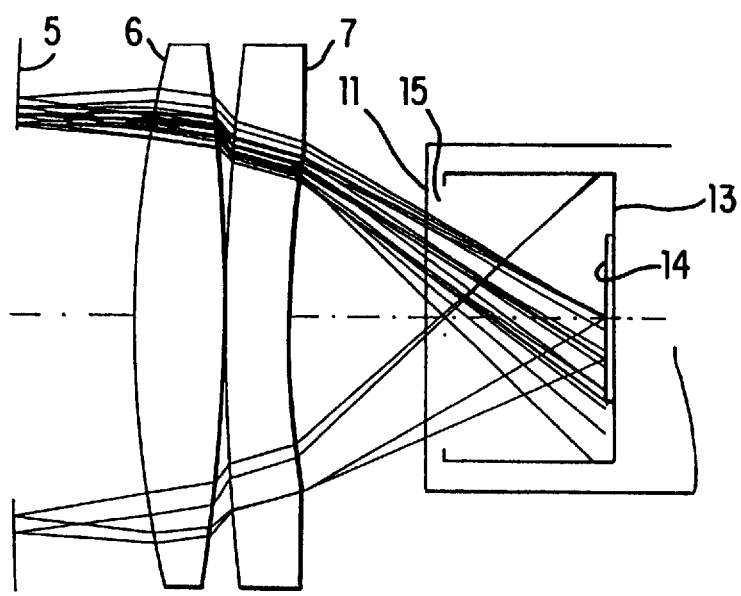
FIG. 2 shows a part of the optical system in accordance with FIG. 1.

FIG. 2 merely shows the ray paths between the intermediate diaphragm 5 and the internal cold shield 11 for the sake of clarity. The cold diaphragm 8 is not illustrated here. In this case as well each optical ray, which comes from the detector element 14 and is outside the optical pupil, is transmitted by the lenses 6 and 7 to the intermediate diaphragm 5 and is reflected back by the same via the lenses 6 and 7 into the or, respectively, onto the internal cold shield 12. Here as well it is the case that part of the light rays, which is reflected back by the intermediate diaphragm 5, and which are incident on the optical area of the detector element 14, will not produce any sharp image here. In this respect the conditions may be so selected that the light rays reflected back by the intermediate diaphragm 5, will pass through the lenses 6 and 7 into the or, respectively, onto the internal cold shield 12 outside the optical area of the detector element 14.

The invention is not limited to the design in accordance with FIG. 1 with a telecentric front diaphragm 2 as an aperture diaphragm. Thus it may be an advantage to arrange the front diaphragm directly in front of or behind the front lens 3. Furthermore it can be an advantage to design the intermediate diaphragm in the form of an aperture diaphragm.

Furthermore it may be an advantage to so arrange and to design the external cold shield made up of staggered external cold diaphragms that by means of the lens arrangement it produces an image of the opening of the internal cold diaphragm on itself. Furthermore one or more external cold diaphragms may be designed in the form of blackened, cooled areas (light traps or retro-reflectors).

In accordance with FIG. 1 the external cold diaphragms 2, 5 and 8 are in the form of three-dimensional segments. However it is furthermore possible to employ reflecting spherical or aspherical three-dimensional segments.

The front diaphragm 2 in accordance with FIG. 1 constitutes an optical infinity interface of the infrared optical system of the invention. Thus it will be accordingly clear to the man in the art that the infrared optical system of the invention may with advantage be utilized as part of a complex infrared optical system. In this respect it may for instance, and without any limitation, be a question of an afocal arranged in front.

It is more particularly in connection with a complex infrared optical system that there is an advantage if the aperture diaphragm as a front or intermediate diaphragm is made with an adjustable opening. The aperture diaphragm may also be designed to be interchangeable so that aperture diaphragms with different opening diameters may be employed. In the selected arrangement and design thereof the lenses will remain independent from changed opening sizes and of the aperture diaphragm up to a maximum permissible opening size of the optical design.

Although the above account has been limited to one preferred embodiment of the invention, this has not been with the intention of limiting the invention thereto. In fact a man in the art will have available a large number of possibilities in order to implement the common inventive principle and in order to adapt to particular circumstances of an individual case. Thus the invention is suitable for application to infrared ray detector equipment in the case of which the detector is not cooled or does not have to be cooled.

We claim:

1. An infrared detector device comprising:

a detector element (14), a first shield means (12) with a first solid radiation inlet aperture (15) which largely protects the detector element against infrared rays, an infrared optical system (1) for representing an infrared image on the detector element, and a second shield means preceding said first shield means in a direction of light and being thermally separated from said first shield means and equipped with a second solid radiation inlet aperture, wherein rays of light reflected by the second shield means hit onto the first shield means outside an optical surface of the detector element, characterized in that the second solid radiation inlet aperture is formed by a plurality of solid diaphragms, comprising a front diaphragm (2) arranged immediately in front of a front lens (3) and a rear diaphragm (8) which immediately precedes said first shield means (12) and follows a rear lens (7).

2. A device according to claim 1, characterized in that an intermediate diaphragm (5) is arranged between two lenses (4, 6) which are arranged between said front diaphragm (2) and said rear diaphragm (8), said front diaphragm or said intermediate diaphragm being an aperture diaphragm.

3. A device according to claim 1, characterized in that said front diaphragm (2) is arranged telecentrically.

4. A device according to claim 2, characterized in that each of said diaphragms (2, 5, 8) reproduces said first inlet aperture on itself by means of said lenses (3, 4, 6, 7).

5. A device according to claim 2, characterized in that said intermediate diaphragm (5) serves to reduce an inside diameter of the preceding lens or lenses.

6. A device according to claim 1, characterized in that the front diaphragm (2) is designed in a manner that a reflected image of the detector element produced by said front diaphragm is not positioned on or in vicinity of an optical surface of the detector element.

7. A device according to claim 2, characterized in that at least one of said diaphragms (2, 5, 8) is designed as a blackened cooled surface.

8. A device according to claim 2, characterized in that at least one of the diaphragms (2, 5, 8) is a mirror-coated spherical or toric calotte.

9. A device according to claim 1, characterized in that the infrared optical system (1) consists of said front diaphragm (2), said first lens (3), a second lens (4), an intermediate diaphragm (5), a third lens (6), the fourth lens (7) and the subsequent rear diaphragm (8), said intermediate diaphragm (5) being disposed at or close to a back of the second lens (4), and said rear diaphragm (8) being disposed close to said fourth lens (7).

* * * * *